United States Patent [19]
Franke et al.

[11] Patent Number: 5,846,580
[45] Date of Patent: Dec. 8, 1998

[54] COMPLETE FLAVOR MIX TRANSFORMED INTO THE GLASSY STATE

[75] Inventors: William Conrad Franke, Cranbury; Jacob Paul Jae, Parsippany; Daniel Thomas Sullivan, West Milford, all of N.J.; Maya Parada, Brooklyn, N.Y.; Francis John Farrell, Madison, N.J.

[73] Assignee: Thomas J. Lipton Co., Division of Conopco, Inc., Englewood Cliffs, N.J.

[21] Appl. No.: 749,119

[22] Filed: Nov. 14, 1996

[51] Int. Cl.⁶ .................................................. A23L 1/00
[52] U.S. Cl. ........................... 426/62; 426/516; 426/641; 426/661
[58] Field of Search .................... 426/61, 62, 512, 426/516, 658, 661, 641, 644, 647

[56] References Cited

U.S. PATENT DOCUMENTS

| | | | |
|---|---|---|---|
| 3,711,301 | 1/1973 | Asogawa et al. | 99/140 |
| 3,970,765 | 7/1976 | Pitchon et al. | 426/534 |
| 4,060,640 | 11/1977 | Kodama et al. | 424/236 |
| 4,232,047 | 11/1980 | Sair et al. | 426/96 |
| 4,232,052 | 11/1980 | Nappen et al. | 426/601 |
| 4,279,940 | 7/1981 | Wurzburg et al. | 426/590 |
| 4,812,445 | 3/1989 | Eden et al. | 514/60 |
| 4,820,534 | 4/1989 | Saleeb et al. | 426/96 |
| 5,009,900 | 4/1991 | Levine et al. | 426/96 |
| 5,087,461 | 2/1992 | Levine et al. | 426/96 |
| 5,376,389 | 12/1994 | Reed et al. | 426/5 |
| 5,472,733 | 12/1995 | Degady et al. | 426/660 |
| 5,603,971 | 2/1997 | Porzio et al. | 426/96 |

FOREIGN PATENT DOCUMENTS

| | | |
|---|---|---|
| 158 460 | 10/1985 | European Pat. Off. . |
| 94/23593 | 10/1994 | WIPO . |
| 96/11589 | 4/1996 | WIPO . |

OTHER PUBLICATIONS

Glass Transitions and Production Stability—An Overview, Timothy W. Schenz, Food Hydrocolloids, vol. 9, No. 4, pp. 307–315, Oxford University Press, 1995.

"Effect of Physical Changes on the Rates of Nonenzymic Browning and Related Reactions", Buera et al., Food Chemistry, 52 (1995) Elsevier Science Limited.

"Glass Transition—Related Physicochemical Changes in Foods", Yrjo Roos, Food Technology, Oct. 1995, pp. 97–102.

"Caking Phenomena in Amorphous Food Powders", Aguilera et al., Trends in Food Science & Technology, May 1995 (vol. 6), pp. 149–155.

Derwent Abstract of WO 94/23593.

*Primary Examiner*—Leslie Wong
*Attorney, Agent, or Firm*—James J. Farrell

[57] ABSTRACT

A completely formulated, ready to cook, food product mix is discussed which is entirely in the glassy state and has a single glass transition temperature. An extrusion process for preparing the product is also discussed.

2 Claims, 3 Drawing Sheets

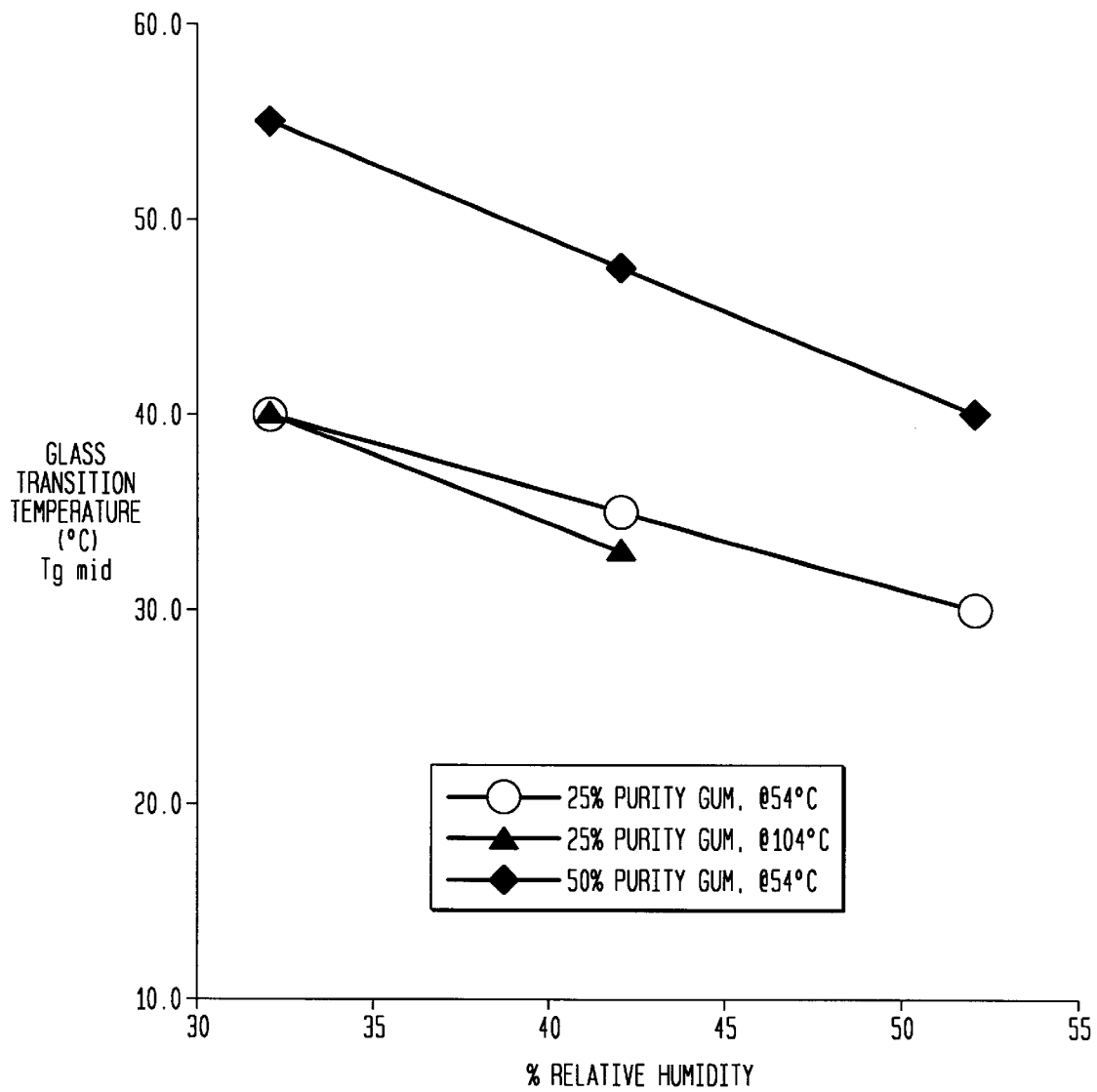

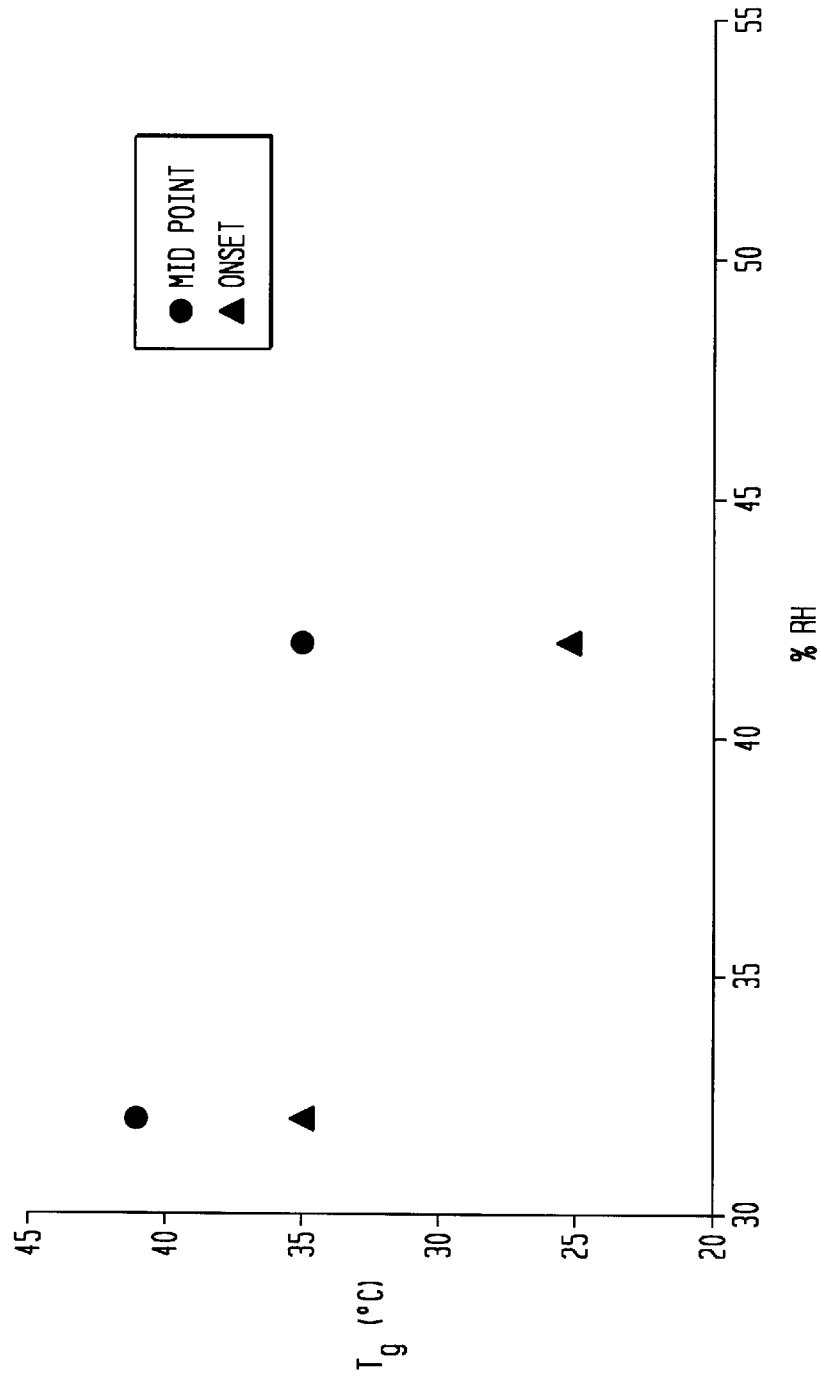

COMPLETE FLAVOR MIX TRANSFORMED INTO THE GLASSY STATE

FIELD OF THE INVENTION

This invention generally relates to the conversion of a dry moisture sensitive food product mix into a shelf stable material wherein all of the components of the mix are transformed into a non-hygroscopic glass having a single glass transition temperature. This is accomplished by preparing an appropriate mixture of the components and then extruding at the proper conditions through a cooker extruder.

BACKGROUND OF THE INVENTION

The stability of dry food mixes and especially mixes containing yeast and other materials which are subject to browning, caking, and flavor degradation, is highly dependant on the amount of water contained in the product and for essentially dried products upon the accessibility of water to the individual food particles. This of course necessitates packaging which will limit the amount of water having access to the mix.

Much of the prior work has been directed to encapsulating various moisture sensitive components.

U.S. Pat. No. 3,711,301 deals with extruding a hygroscopic powdery composition, granulating the extrudate and coating the granules with a non-hygroscopic material.

U.S. Pat. No. 5,087,461 employs a double encapsulated composition containing volatile or labile components. The encapsulating material is a carrier composed of a specific mixture of carbohydrates which carbohydrates are converted into a glassy matrix.

U.S. Pat. Nos. 5,009,900 and 4,820,534 also employ an extruded glassy matrix or substrate to encapsulate flavorants and the like.

U.S. Pat. No. 4,232,047 mixes an edible agent with an encapsulating medium and extrudes it with a limited quantity of water to provide a glassy extrudate with an ingestible agent dispersed in it.

U.S. Pat. No. 4,812,445 deals with encapsulation of various components in a starch matrix.

U.S. Pat. Nos. 4,279,940 and 4,232,052 also deal with starches.

The prior art methods for the encapsulation of volatile components in carbohydrate matrices principally deal with obtaining a sufficiently high glass transition temperature for the glassy encapsulating matrices. Although the glassy carbohydrate matrices do not have the sharp melting point characteristic of crystalline solids, they do have a glass transition temperature (also known as softening temperature). This glass transition temperature is usually defined as the temperature at which the amorphous solid matrix softens and becomes a viscous liquid. In contrast, the instant invention does not employ an encapsulation of selected components in a glassy matrix but rather converts the entire product into the glassy state, thus improving stability.

The storage stability of low moisture foods is affected by their physical state. At a certain temperature and moisture content the foods undergo a 'glass transition' i.e. transition from the hard, brittle state into a lower viscosity 'rubbery' state. Below the glass transition temperature, food remains stable for long periods of time due to extremely low molecular activity. All types of degradation reactions including browning, caking, and flavor changes become, in effect, frozen in time. Thus it is desirable to employ a material having a glass transition temperature well above the temperature at which the product is stored.

The glass transition temperature of a particular food product is greatly affected by its moisture content. Most dry food mixes have a hygroscopic nature. Since the glassy materials are plasticized and solubilized by water as well as softened by heat, it is important that the product not come into contact with water until cooking is desired.

The hygroscopic nature of some prior art materials requires special precautions to prevent plasticization of the matrix by atmospheric moisture. Since, under industrial conditions, it is virtually impossible to keep the matrices under completely anhydrous conditions, many prior art compositions require the use of anti-caking agents to prevent caking caused by plasticization of the matrix by moisture adsorbed from the air.

The glassy mixture created by this process resists browning, caking, and flavor degradation in the presence of atmospheric moisture.

SUMMARY OF THE INVENTION

The instant invention is based on the complete conversion of a substantially homogeneous mixture of edible materials containing proteins and selected carbohydrates into a glassy state having a single glass transition temperature throughout. This is accomplished by extrusion at selected temperatures; pressures governed by mechanical changes to the extruder and water content. There is no encapsulation of selected components in a matrix. This type of encapsulation would produce something other than a single glass transition temperature.

Glass transition temperatures and the glassy state is fully described in a book entitled "The Glassy State in Foods" edited by JMV Blanshard and P. J. Lillford and published by Nottingham University Press, 1993.

The glass transition temperature of the final product of the present invention declines sharply with increasing water content. Accordingly, the water content should be kept as low as possible. In contrast to this requirement of low water, however, the extrudability of the mixture declines with decreasing water content, and if the water content of the mixture is too low, the extruder may clog or generate heat sufficient to cause undesirable changes in the product. Accordingly, the optimum water content for extrusion of any particular mixture is a compromise between the glass transition temperature of the product to be produced and the extrudability of the mixture. The optimum water content for any specific mixture can readily be determined by routine empirical tests, which will be familiar to those skilled in the art and amounts to about 2% to about 10% in the final product. It is usually necessary to add some water to the mixture to assist in the extrusion of the product. Desirably, the moisture content of the final glassy product is in the range of about 3 to about 7% by weight.

The particle size of the various components used to form the glassy product is preferably relatively small but it does not appear to be critical; use of the normal comminuted commercial forms of the various materials has been found to give satisfactory results. However, care should of course be taken to ensure that the ingredients do not contain particles so large as to introduce significant heterogeneities into the glassy product. It is important to insure the component ingredients are well mixed before extrusion.

To form the mixture of ingredients which will be extruded to form the glassy product, no special mixing techniques are required. The various ingredients are simply added to a mixer (for example, a Hobart mixer) and mixed until a homogeneous mixture is obtained.

When the addition of water is needed for proper extrusion of the mixture, this water is added directly to the extruder, in a manner which will be familiar to those skilled in extruder technology.

BRIEF DESCRIPTION OF THE DRAWINGS

FIG. 2 illustrates the results of Example 2 which relates the glass transition temperature to percent relative humidity.

FIG. 3 illustrates the results of Example 3 which relates the glass transition temperature to percent relative humidity.

DETAILED DESCRIPTION OF THE INVENTION

Figure 1:
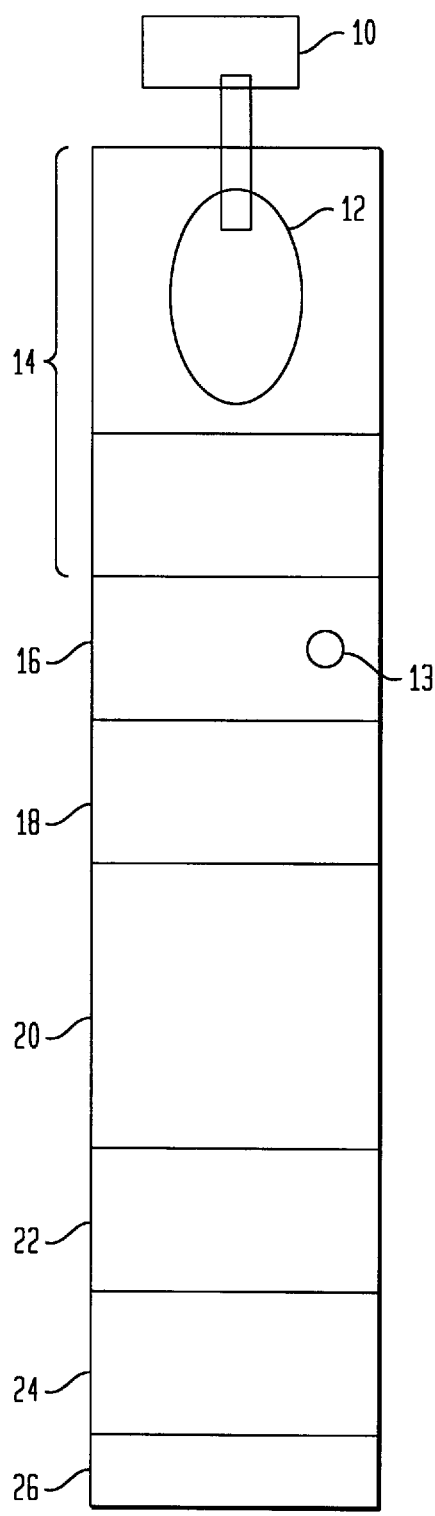
FIG. 1 illustrates a twin screw extruder in a preferred embodiment for the practice of the present invention.

The mixture must contain about 5 to about 50% of the identifying component powder. This "identifying component" will usually govern the designation of the final product, for example chicken, bean, tomato and the like. Preferably the mixture contains about 10% to 35% of this identifying component. In addition, high concentrations of vegetable powders, sodium chloride about 5 to 20% and yeast in an amount of about 5 to 20% are employed.

In addition to these essential components, a starch component in an amount of about 5% to about 50% and preferably 10% to about 25% is used. Usually a higher molecular weight starch that when mixed and extruded will form an appropriate glass transition temperature is used. This glass transition temperature is preferably about 30° C. to 60° C. Fats are usually deleterious in forming the required glassy state.

In the process of the present invention, a composition containing at least one degradable or brownable component is formed into a glassy state which includes selected carbohydrates.

The carbohydrate component, which comprises from about 5 to about 50%, and preferably about 10 to about 25% by weight of the mixture, is a water-soluble, chemically-modified starch having a dextrose equivalent (DE) below about 2. Useful starches include food-grade products derived from corn, rice, potato, sago, tapioca, waxy maize, wheat, etc., as well as any food-grade modifications thereof, for example, the acetate, propionate, and butyrate esters, as well as the hydroxyethyl, hydroxypropyl and carboxymethyl esters. Desirably, the starch derivative has a dextrose equivalent in the range of about 0.5 to about 2.0. Starch derivatives suitable for use in the present process are readily available commercially; one specific commercial product which has been found to give good results in the present process is that sold as Amiogum 23 by American Maize-Products Co., Hammond, Ind. It has been found that $M_n$, the number average molecular weight of this material is approximately 18,000. A second product is Purity Gum BE which is a modified corn starch obtainable from National Starch and Chemical Co.

The Tg for carbohydrate materials useful in the invention is above about 100° C. preferably above about 140° C. In essence the Tg must be sufficiently high to give a final product having a Tg above about 30° C. and preferably above about 40° C.

The extrusion of the dry mixture to form the glassy product requires close control because of the inherent difficulty of extruding a powdered composition. As already stated, in many cases it is desirable to add a limited amount of water during extrusion to achieve a balance between extrusion efficiency and the desirable moisture content in the final glassy product. Both single and twin screw extruders may be used, but the screw speed should be carefully regulated to prevent the development of excessive pressures and temperatures which produce an unsatisfactory product. Generally, extruder temperatures should lie within the range of about 30° C. to about 120° C. since exposure to higher temperatures tends to produce undesirable damage to the materials and a less satisfactory product. It has been found desirable to use extruders which are capable of providing multiple zones with differing temperatures; in a preferred embodiment of the invention, the extrudate leaves the extruder, with a temperature in the range of from about 50° C. to about 100° C.

The physical dimensions of the extruded material or extrudate are not critical, and may vary depending upon its intended use. However, it has been found convenient to produce the extrudate in the form of pellets having a diameter of approximately 6.0 mm. Once the extrudate has been obtained, in order to produce a uniform appearance, it is preferred to grind the extrudate, generally to below 14 U.S. mesh.

A preferred multiple-zoned extruder useful in carrying out the method of the present invention is a twin screw extruder which has two intermeshing screw shafts composed of individual conveying, mixing and kneading elements of different pitches and lengths. The preferred embodiment uses a co-rotating twin screw extruder such as a Werner Pfleiderer or equivalent. Each intermeshing screw rotates in the same direction in the barrel in a bore having a figure eight cross section. Preferably, the twin screw extruder contains forward feed screws, forward compression screws, forward mixing screws or paddles, kneading screws, and reverse flight screws. The forward feed screws move product forward with least resistance. The forward compression screws raise the product pressure. The reverse flight screws increase the residence time of the product in the screws for faster melting. The forward mixing paddles insure product homogeneity. The paddle elements of the extrusion apparatus can be set at various angles to provide mixing of the various ingredients in an unidirectional flow without generating high temperatures and pressures which can damage the ingredients. A thermocouple may also be optionally included in the extruder for monitoring internal temperatures.

The top of the extruder barrel useful in carrying out the method of the present invention may also contain numerous entry ports for introducing various optional ingredients described further below. Those ports not being used for introducing the ingredients are sealed to provide a closed system. The order of introduction of any optional ingredients is a matter of choice for the artisan. The final product can be custom tailored by selecting different entry ports for the various ingredients.

The resultant product is obtained as a glassy mass which may be formed into desired shapes or, once properly tempered, cut into workable portions or formed by using other conventional methods.

The method of the present invention for continuously preparing a product can best be understood by reference to FIG. 1. FIG. 1 illustrates a twin screw extruder, such as the Werner Pfleiderer configured in a preferred embodiment for the practice of the present invention. Although the present invention is described and illustrated in connection with the preferred embodiments, applicants intend that modifications and variations may be used without departing from the spirit and scope of the invention.

As set out in FIG. 1, the complete product mix is fed from a feed hopper 10 into the fee opening 12 into the first zone 14 of the twin screw extruder via a screw feeder to insure feed rate accuracy. The first zone 14 is configured with forward feed conveying screws to move the material consistently downstream and prevent backup of the complete product mix at the inlet feeding port. The second zone 16 is configured with forward conveying and forward compression screws. Water is added in this zone through water injector 13 to hydrate the mix. The third zone 18 is configured with a forward flight mixing screw to insure homogeneity/hydration of the mix and forward conveying screws to prevent the product mix from backing up and absorbing excessive amounts of water. The fourth zone 20 is configured with forward compression and conveying screws and the temperature is elevated to melt the mix. The fifth zone 22 is configured with forward mixing paddles, to insure even melting of the mix. This fifth zone 22 also has forward compression screws and reverse mixing paddles to compact and increase the residence time in the screws. The sixth zone 24 is configured with forward compression screws to compact the mix and force the melt through the die plate 26 at the end of the twin screw extruder.

Each Zone of the extruder has a suitable, predetermined temperature set point. FIG. 1, Zone 1 (14) is set equal to 30° C.±5° C.; Zone 2 (16) is set equal to 70° C.±5° C.; Zone 3 (18) is set equal to 80° C.±5° C.; Zone 4 (20) is set equal to 115° C.±5° C.; Zone 5 (22) is set to 90° C.±5° C.; Zone 6 (24) is set to 30° C.±5° C. The actual temperature in each Zone may vary from the set point since the actual temperature will of course be dependent on the heat capacity of the carbohydrate or starch used.

A list of the extruder conditions follows where L represents the length of a single barrel section:

ZONE 1 (14) 2L open barrel. Powder feed, conveying elements temp. 30° C.

ZONE 2 (16) 1L closed barrel (water injector (13)) conveying, compacting elements 70° C.

ZONE 3 (18) 1L closed barrel mixing, compression, conveying 80° C.

ZONE 4 (20) 2L closed barrel compression, heating, kneading 115° C.

ZONE 5 (22) 1L closed barrel, kneading, cooling, compression, 90° C.

ZONE 6 (24) 1L closed barrel, cooling, compression 30° C.

The agent is fed into Zone 1 (14) at a feed rate from about 50 lbs./hr. to about 400 lbs./hr., preferably from about 100 lbs./hr. to about 200 lbs./hr. A mixing speed of from about 200 rpm to about 400 rpm, preferably from about 275 rpm to about 325 rpm, is used to convey the agent in the downward direction of conveyance through the extrusion zones.

DESCRIPTION OF THE PREFERRED EMBODIMENT

Having generally described various aspects of the present invention, the invention will now be more particularly described with reference to the following specific examples. All parts and percentages are by weight unless otherwise specified.

EXAMPLE 1

This example illustrates the conversion of a moisture sensitive food product mix into a shelf stable glass by process of the present invention. The ingredients used were as follows:

| Ingredient | Weight Percent |
| --- | --- |
| Powdered Chicken | 33 |
| Purity Gum BE Starch | 25 |
| Yeast | 15 |
| Salt | 13 |
| Vegetable Powder | 12 |
| Spices | 2 |

These ingredients are mixed together in a Hobart mixer at low speed for 15 minutes.

The mixture is then extruded using a twin screw extruder as follows: the mixture is then extruded using a twin screw extruder with 6 temperature zones having paddles and compression means as previously described. The zones are respectively set at 30°, 70°, 80°, 115°, 90°, and 30° C. from the feed to the outlet of the barrel. A small amount of water is added in Zone 2 (16) to form a homogenous mixture and to facilitate extrusion. The material is extruded through two single dies at the end of each screw in the shape of a square with a side of 6 mm. The material exiting the extruder was stiff and firm and had a temperature of 54° C. Upon cooling the material became a rigid glass as demonstrated by differential scanning calorimetry in FIG. 2 and the glass transition temperature was increased over a non extruded mixture of the same ingredients. The extruded material had a glass transition temperature of 40° C. at 32% relative humidity, 35° C. at 42% relative humidity and 30° C. at 52% relative humidity. The glass transition temperature of non-extruded dry powder of the same composition was measured to be 29° C. at 32% relative humidity.

EXAMPLE 2

This Example again illustrates the conversion of a moisture sensitive food product mix into a shelf stable glass by the process of the present invention, but in this case the starch derivative was added to bring its weight percent in the final mixture up to 50%. The ingredients used were as follows:

| Ingredient | Weight Percent |
| --- | --- |
| Purity Gum BE Starch | 50 |
| Powdered Chicken | 22 |
| Yeast | 10 |
| Salt | 9 |
| Vegetable Powder | 8 |
| Spices | 1 |

The ingredients were mixed in a Hobart mixer for 15 minutes and then fed into the twin screw extruder. The mixture was extruded in the same manner as in Example 1 with the same set points in the temperature zones. The same die was used. The material exiting the extruder was stiff and firm and had a temperature of 54° C. Upon cooling the material became a rigid glass as demonstrated by differential scanning calorimetry, with a glass transition temperature of 55° C. at 32% relative humidity, 49° C. at 42% relative humidity and 40° C. at 52% relative humidity. This is a significant improvement over the non-extruded blend and also an improvement over the glass produced in Example 1. The glass transition temperature of non-extruded dry powder of the same composition was measured to be 29° C. at 32% relative humidity. Samples of this glass material, milled and of a particle size which passed through a No. 8 U.S. standard screen and collected on a No. 20 U.S. standard screen were placed in humidity chambers at 55% and 65% relative humidity along with non-extruded material of the same composition. The non-extruded material was fully caked in 48 hours at 65% relative humidity and in 2 weeks at 55% relative humidity. The glass material exhibited caking after 4 months at 65% relative humidity and 8 months at 55% relative humidity. The importance of tests at 55% R.H. is that certain types of undesirable growth can occur above this level. Results of this example are reported in FIG. 2.

EXAMPLE 3

This Example again illustrates the conversion of a moisture sensitive food product mix into a shelf stable glass by process of the present invention, but in this case the starch derivative was added to bring its weight percent in the final mixture up to 20%. The ingredients used were as follows:

| Ingredient | Weight Percent |
| --- | --- |
| Powdered Chicken | 35 |
| Purity Gum BE Starch | 20 |
| Yeast | 16 |
| Salt | 15 |
| Vegetable Powder | 12 |
| Spices | 2 |

The ingredients were mixed in a Hobart mixer for 15 minutes and then fed into the twin screw extruder. The mixture was extruded in the same manner as in Example 1 with the same set points in the temperature zones and water added in an identical fashion. In this example, however, the die plate was removed from the extruder and the firm glassy material was collected as granules ranging in size from 2 to 5 mm in diameter. The temperature of the material exiting the extruder was 60° C. In this case, no cutting and milling of the material was necessary to form a free flowing granule; it was collected directly out of the extruder and required only cooling before being packaged. Upon cooling the material became a rigid glass as demonstrated by differential scanning calorimetry, with a glass transition temperature of 41° C. at 32% relative humidity and 35° C. at 42% relative humidity. The glass transition temperature of non-extruded dry powder of the same composition was measured to be 28° C. at 32% relative humidity.

Samples of this glass material, collected as 2–5 mm granules directly from the extruder were placed in humidity chambers at 55% and 65% relative humidity along with non-extruded material of the same composition. The non-extruded material was fully caked in 48 hours at 65% relative humidity and in 2 weeks at 55% relative humidity. The glass material exhibited caking after 1 month at 65% relative humidity and has not caked after 5 months at 55% relative humidity. Tg results are reported in FIG. 3.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A method for preparing a completely formulated ready to cook product mix in the glassy state which comprises, in the downstream direction of conveyance the continuous sequence of steps of:

a) introducing dry food ingredients into the barrel of an extruder equipped with multiple heating zones;

b) adding water to said dry ingredients and heating to form a homogeneous mixture which can be extruded;

c) extruding said mixture through multiple zones; and d) cooling the mixture to form a stable glass which can be cut cleanly at the surface of the die or can emerge from the extruder as individual granules without the use of a die, whereby the completely formulated product mix has a single glass transition temperature of about 30° C. to about 60° C.

2. A method as defined in claim 1 wherein the dry ingredients are:

20 to 50% characterizing component 5 to 50% starch 10 to 25% yeast or yeast extract 10 to 25% sodium chloride 5 to 20% vegetable powders 1 to 10% spices or spice extract and are mixed to form a homogeneous mixture prior to introduction into the extruder.

* * * * *